(12) United States Patent
Meldolesi et al.

(10) Patent No.: US 7,963,259 B2
(45) Date of Patent: Jun. 21, 2011

(54) HYDRO-MECHANICAL VALVE ACTUATION SYSTEM FOR SPLIT-CYCLE ENGINE

(75) Inventors: Riccardo Meldolesi, Hove (GB); Clive Lacy, Goring-by-Sea (GB)

(73) Assignee: Scuderi Group, LLC, West Springfield, MA (US)

( * ) Notice: Subject to any disclaimer, the term of this patent is extended or adjusted under 35 U.S.C. 154(b) by 412 days.

(21) Appl. No.: 12/217,150

(22) Filed: Jul. 1, 2008

(65) Prior Publication Data

US 2009/0039300 A1 Feb. 12, 2009

Related U.S. Application Data

(60) Provisional application No. 60/963,742, filed on Aug. 7, 2007.

(51) Int. Cl.
*F01L 9/02* (2006.01)
(52) U.S. Cl. ............... 123/90.12; 123/90.15; 123/90.16
(58) Field of Classification Search .............. 123/90.12, 123/90.15, 90.16
See application file for complete search history.

(56) References Cited

U.S. PATENT DOCUMENTS

| | | | |
|---|---|---|---|
| 4,000,756 A | 1/1977 | Ule et al. | |
| 5,058,538 A | 10/1991 | Erickson et al. | |
| 5,119,779 A | 6/1992 | Plohberger et al. | |
| 5,152,258 A | 10/1992 | D'Alfonso | |
| 5,154,143 A | 10/1992 | Stutzenberger | |
| 5,638,781 A | 6/1997 | Sturman | |
| 6,267,098 B1 | 7/2001 | Vanderpoel | |
| 6,880,501 B2 | 4/2005 | Suh et al. | |
| 6,883,492 B2 * | 4/2005 | Vanderpoel et al. | 123/321 |

* cited by examiner

*Primary Examiner* — Zelalem Eshete
(74) *Attorney, Agent, or Firm* — Fildes & Outland, P.C.

(57) ABSTRACT

A hydro-mechanical system is disclosed for actuating an outwardly opening valve of an engine, such as a crossover passage valve of a split-cycle engine. A developed embodiment includes a body having a plunger cylinder in hydraulic fluid communication with a valve cylinder. A plunger in the plunger cylinder is reciprocated to displace hydraulic fluid into the valve cylinder, the engine valve being opened by the hydraulic fluid displaced by the plunger into the valve cylinder and acting against the valve piston. A valve spring, preferably an air spring returns the engine valve to engage an outwardly facing valve seat to close a gas passage of the engine. Control valves and an energy reusing accumulator, along with valve seating control and lift brake features may also be included.

21 Claims, 20 Drawing Sheets

HYDRO-MECHANICAL VALVE ACTUATION SYSTEM FOR SPLIT-CYCLE ENGINE

CROSS REFERENCE TO RELATED APPLICATIONS

This application claims the benefit of U.S. Provisional Patent Application No. 60/963,742 filed Aug. 7, 2007.

TECHNICAL FIELD

The present invention relates to hydro-mechanical valve actuation systems. More particularly, the invention relates to a split-cycle internal combustion engine having a hydro-mechanical system for actuating outwardly opening crossover valves and the like.

BACKGROUND OF THE INVENTION

For purposes of clarity, the following definition is offered for the term "split-cycle engine" as may be applied to engines disclosed in the prior art and as referred to in the present application.

A split-cycle engine as referred to herein comprises:
a crankshaft rotatable about a crankshaft axis;
a compression piston slidably received within a compression cylinder and operatively connected to the crankshaft such that the compression piston reciprocates through an intake stroke and a compression stroke during a single rotation of the crankshaft;
an expansion (power) piston slidably received within an expansion cylinder and operatively connected to the crankshaft such that the expansion piston reciprocates through an expansion stroke and an exhaust stroke during a single rotation of the crankshaft; and
a crossover passage interconnecting the compression and expansion cylinders, the crossover passage including a crossover compression (XovrC) valve and a crossover expansion (XovrE) valve defining a pressure chamber therebetween.

U.S. Pat. No. 6,543,225 granted Apr. 8, 2003 to Carmelo J. Scuderi (herein Scuderi) contains an extensive discussion of split-cycle and similar type engines. In addition the patent discloses details of a prior version of an engine of which the present invention comprises a further development.

Referring to FIG. 1, an exemplary embodiment of a prior art split-cycle engine concept of the type described in Scuderi is shown generally by numeral 10. The split-cycle engine 10 replaces two adjacent cylinders of a conventional four-stroke engine with a combination of one compression cylinder 12 and one expansion cylinder 14. These two cylinders 12, 14 perform their respective functions once per crankshaft 16 revolution. The intake air and fuel charge is drawn into the compression cylinder 12 through typical poppet-style intake valves 18. The compression cylinder piston 20 pressurizes the charge and drives the charge through the crossover passage 22, which acts as the intake passage for the expansion cylinder 14.

A check type crossover compression (XovrC) valve 24 at the crossover passage inlet is used to prevent reverse flow from the crossover passage 22. A crossover expansion (XovrE) valve 26 at the outlet of the crossover passage 22 controls flow of the pressurized intake charge such that the charge fully enters the expansion cylinder 14 shortly after the expansion piston 30 reaches its top dead center (TDC) position. Spark plug 28 is fired soon after the intake charge enters the expansion cylinder 14 and the resulting combustion drives the expansion cylinder piston 30 down toward bottom dead center (BDC). Exhaust gases are pumped out of the expansion cylinder through poppet exhaust valves 32.

With the split-cycle engine concept, the geometric engine parameters (i.e., bore, stroke, connecting rod length, compression ratio, etc.) of the compression and expansion cylinders are generally independent from one another. For example, the crank throws 34, 36 for each cylinder may have different radii and be phased apart from one another with top dead center (TDC) of the expansion cylinder piston 30 occurring prior to TDC of the compression cylinder piston 20. This independence enables the split-cycle engine to potentially achieve higher efficiency levels and greater torques than typical four-stroke engines.

However, the crossover expansion valve of a split-cycle engine, unlike conventional four stroke engines, has a very small window of actuation timing (about 30 crank angle degrees) in which to open and deliver a turbulent high pressure air/fuel charge into the engine expansion cylinder for ignition, combustion and expansion in the cylinder. In view of the high pressures and small actuation timing involved, an alternative to mechanical valve actuation was desired for actuation of the engine valves, and the crossover expansion valve in particular.

SUMMARY OF THE INVENTION

The present invention provides a hydro-mechanical valve actuation system designed for actuating high pressure outwardly opening engine valves, such as the crossover valves of a split-cycle engine, particularly the crossover expansion valve which must quickly force charges of pressurized air/fuel mixture into the expansion cylinder with turbulence to assure rapid combustion of the charges.

A system according to the invention may include:
A hydro-mechanical system for actuating an outwardly opening valve of an engine, the system comprising:
a body having a plunger cylinder in hydraulic fluid communication with a valve cylinder;
a plunger in the plunger cylinder and reciprocable through pumping and return strokes to displace hydraulic fluid into the valve cylinder;
an outwardly opening engine valve reciprocable in the body and connected with a valve piston in the valve cylinder, the engine valve being opened by the hydraulic fluid displaced by the plunger into the valve cylinder and acting against the valve piston;
an actuator for reciprocating the plunger; and
a valve spring for returning the engine valve to engage an outwardly facing valve seat, thereby closing a gas passage of the engine controlled by the engine valve.

In addition, the combination of a hydro-mechanical valve actuating system according to the invention with a split-cycle engine may include:
The hydro-mechanical system outlined above in combination with a split-cycle engine including:
a crankshaft rotatable about a crankshaft axis;
a compression piston slidably received within a compression cylinder and operatively connected to the crankshaft such that the compression piston reciprocates through an intake stroke and a compression stroke during a single rotation of the crankshaft;
an expansion (power) piston slidably received within an expansion cylinder and operatively connected to the crankshaft such that the expansion piston reciprocates through an expansion stroke and an exhaust stroke during a single rotation of the crankshaft; and a crossover passage (port) interconnecting the compression and expansion cylinders, the crossover passage including an outwardly opening crossover compression (XovrC) valve and an outwardly opening crossover expansion (XovrE) valve defining a pressure chamber therebetween;

wherein the hydro-mechanical system acutates the XovrE valve.

Further, the split-cycle engine with the hydro-mechanical valve actuating system may also include:

a hydraulic accumulator having an air spring acting against the accumulator piston to return stored energy in accumulated hydraulic fluid to the main chamber for restoring the plunger to an initial position;

a timing solenoid valve to control the period of hydraulic actuation pressure generated by the displacement of the plunger and acting against the valve piston; and a locking solenoid valve for locking the valve piston and reducing parasitic hydraulic losses.

These and other features and advantages of the invention will be more fully understood from the following detailed description of the invention taken together with the accompanying drawings.

DETAILED DESCRIPTION OF THE INVENTION

Split-Cycle Engine

Figure 1:
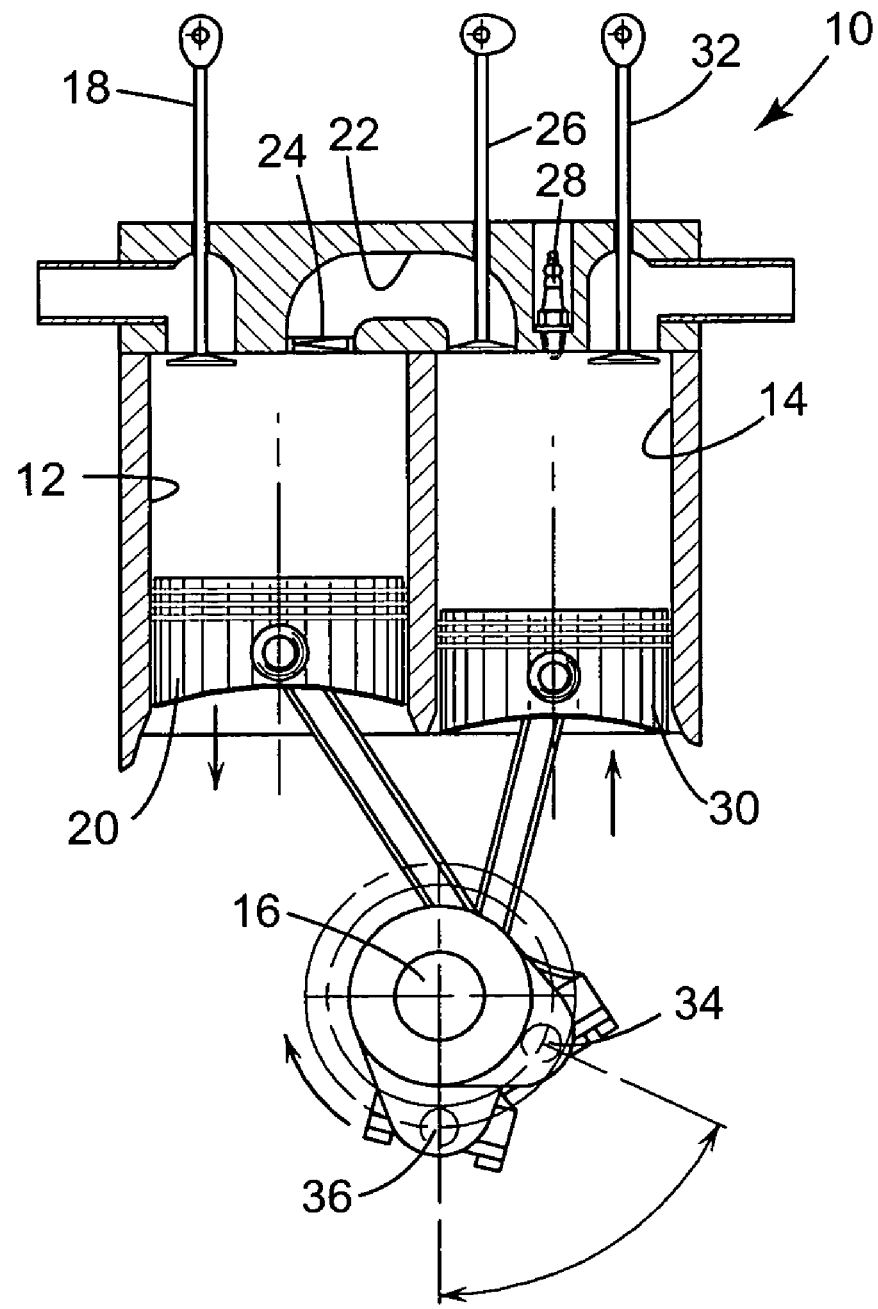
FIG. 1 is a schematic cross-sectional view of a prior art split-cycle engine related to the engine of the invention.
Figure 2:
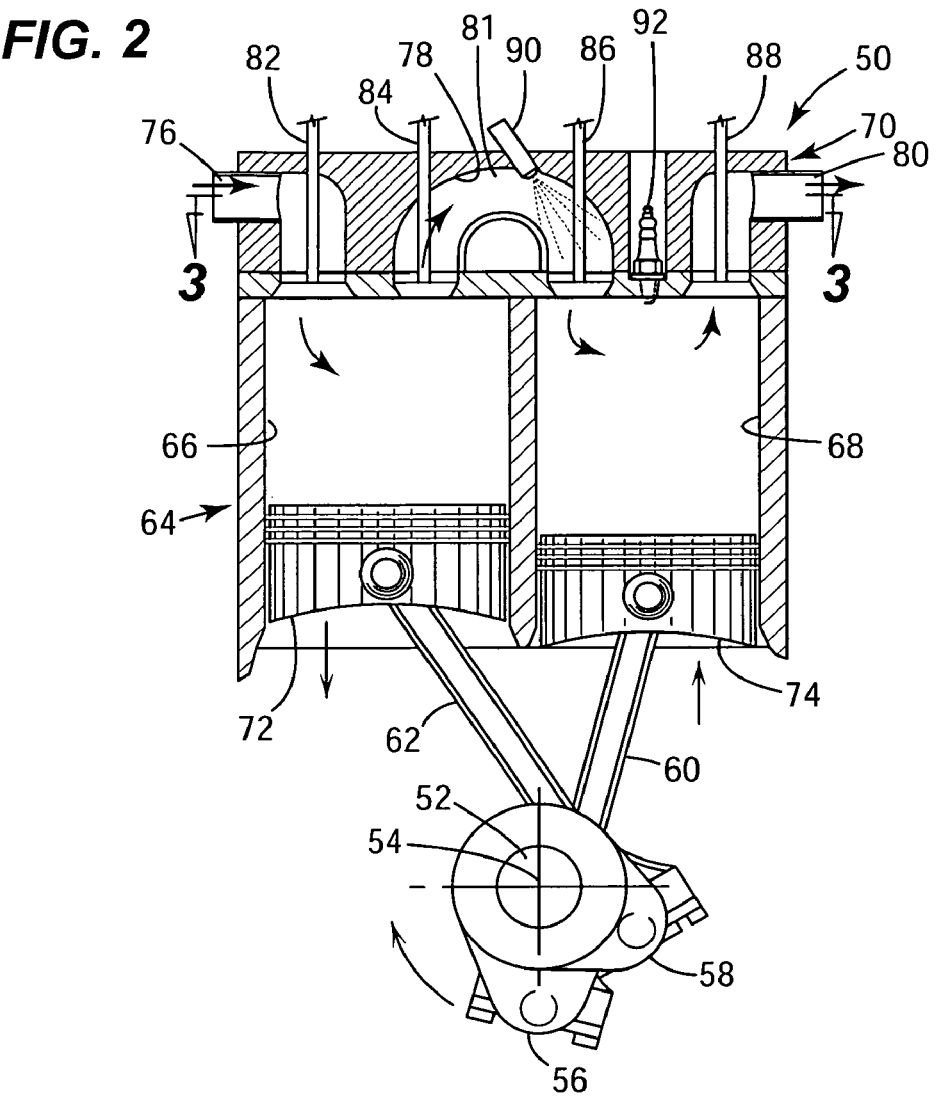
FIG. 2 is a schematic cross-sectional view of an exemplary split-cycle engine according to the present invention.
Figure 3:
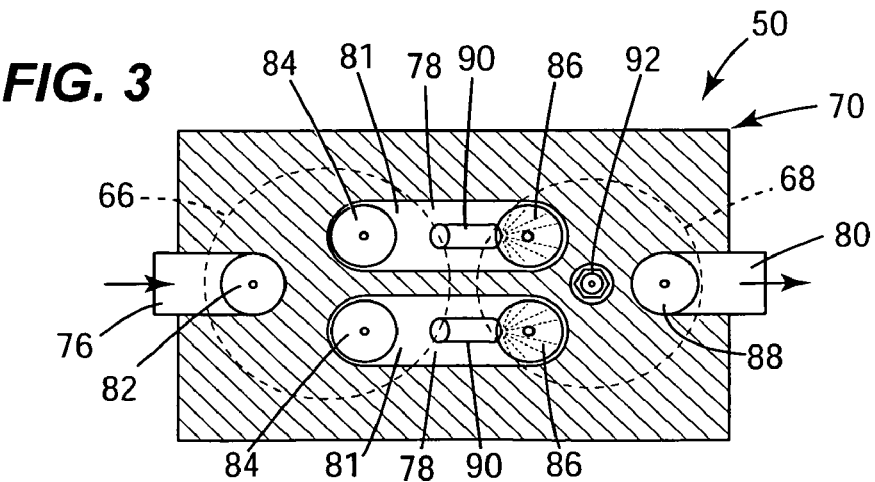
FIG. 3 is a cross-sectional top view of the split-cycle engine taken through line 3-3 of FIG. 2 with fuel injectors superimposed.

Referring now to FIGS. 2 and 3 of the drawings in detail, numeral 50 generally indicates a diagrammatic representation of a split-cycle engine according to the invention. Engine 50 includes a crankshaft 52 rotatable about a crankshaft axis 54 in a clockwise direction as shown in the drawing. The crankshaft 54 includes adjacent angularly displaced leading and following crank throws 56, 58, connected to connecting rods 60, 62, respectively.

Engine 50 further includes a cylinder block 64 defining a pair of adjacent cylinders, in particular a compression cylinder 66 and an expansion cylinder 68 closed by a cylinder head 70 at one end of the cylinders opposite the crankshaft 54.

A compression piston 72 is received in compression cylinder 66 and is connected to the connecting rod 62 for reciprocation of the piston between top dead center (TDC) and bottom dead center (BDC) positions. An expansion piston 74 is received in expansion cylinder 68 and is connected to the connecting rod 60 for similar TDC/BDC reciprocation. The diameters of the cylinders and pistons and the strokes of the pistons and their displacements need not be the same.

In an exemplary embodiment, the cylinder head 70 provides the means for gas flow into, out of and between the cylinders 66, 68. In the order of gas flow, the cylinder head includes an intake port 76 through which intake air is drawn into the compression cylinder 66, a pair of crossover (Xovr) passages 78 (at least one passage required) through which compressed air (gas) is transferred from the compression cylinder 66 to the expansion cylinder 68, and an exhaust port 80 through which spent gases are discharged from the expansion cylinder. Each crossover passage 78 also defines a pressure chamber 81 in which pressurized gas is stored between closing of the crossover expansion (XovrE) valve (86) during the expansion stroke of the expansion piston 74 on one cycle (crank rotation) of the engine and opening of the crossover compression (XovrC) valve (84) during the compression stroke of the compression piston 72 on the following cycle (crank rotation) of the engine.

In the selected embodiment, gas flow into the compression cylinder 66 is controlled by an inwardly opening intake valve 82, which may be actuated by any suitable engine drive mechanism, such as by an intake cam, not shown. Gas flow into and out of each crossover passage 78 may be controlled by a pair of outwardly opening valves, namely a crossover compression (XovrC) valve 84 at an inlet end of each Xovr passage and a crossover expansion (XovrE) valve 86 at an outlet end of each crossover passage.

XovrC valve 84 may be actuated in any suitable manner. However, in accordance with the invention, at least XovrE valve 86, and preferably both valves 84 and 86 are actuated by a hydro-mechanical valve actuation system 100 subsequently discussed in detail.

Exhaust gas flow out the exhaust port 80 is controlled by an inwardly opening exhaust valve 88 actuated, such as by an exhaust cam, not shown. The cams may be mechanically engine driven or operated by any other suitable engine drive mechanism, with timing as desired relative to the instantaneous angular position of the crankshaft 52, or alternative torque output device.

Each crossover passage 78 has at least one high pressure fuel injector 90 disposed therein. The fuel injectors are operative to inject fuel into charges of compressed air within the pressure chambers 81 of the crossover passages 78.

Engine 50 also includes one or more spark plugs 92 or other ignition devices. The spark plugs 92 are located at appropriate locations in the end of the expansion cylinder 68 wherein a mixed fuel and air charge may be ignited and burned during the expansion stroke. Alternatively, engine 50 may also be configured as a compression ignition engine, instead of a spark ignition engine, and still be within the scope of this invention.

Hydro-Mechanical Valve Actuating System

Figure 4:
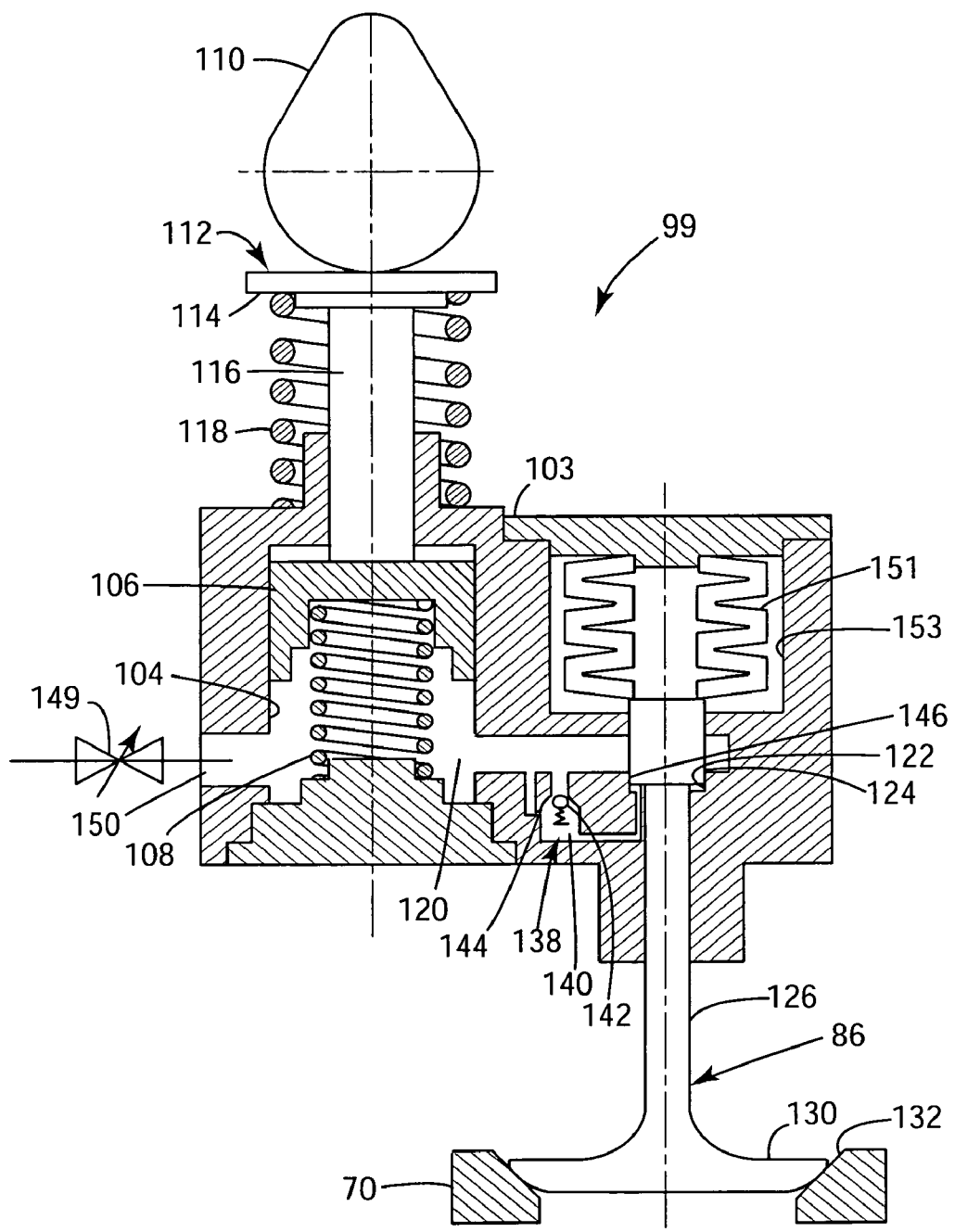
FIG. 4 is a schematic cross-sectional view of a basic embodiment of a hydro-mechanical valve actuating system with a mechanical valve return spring according to the invention.
Figure 5:
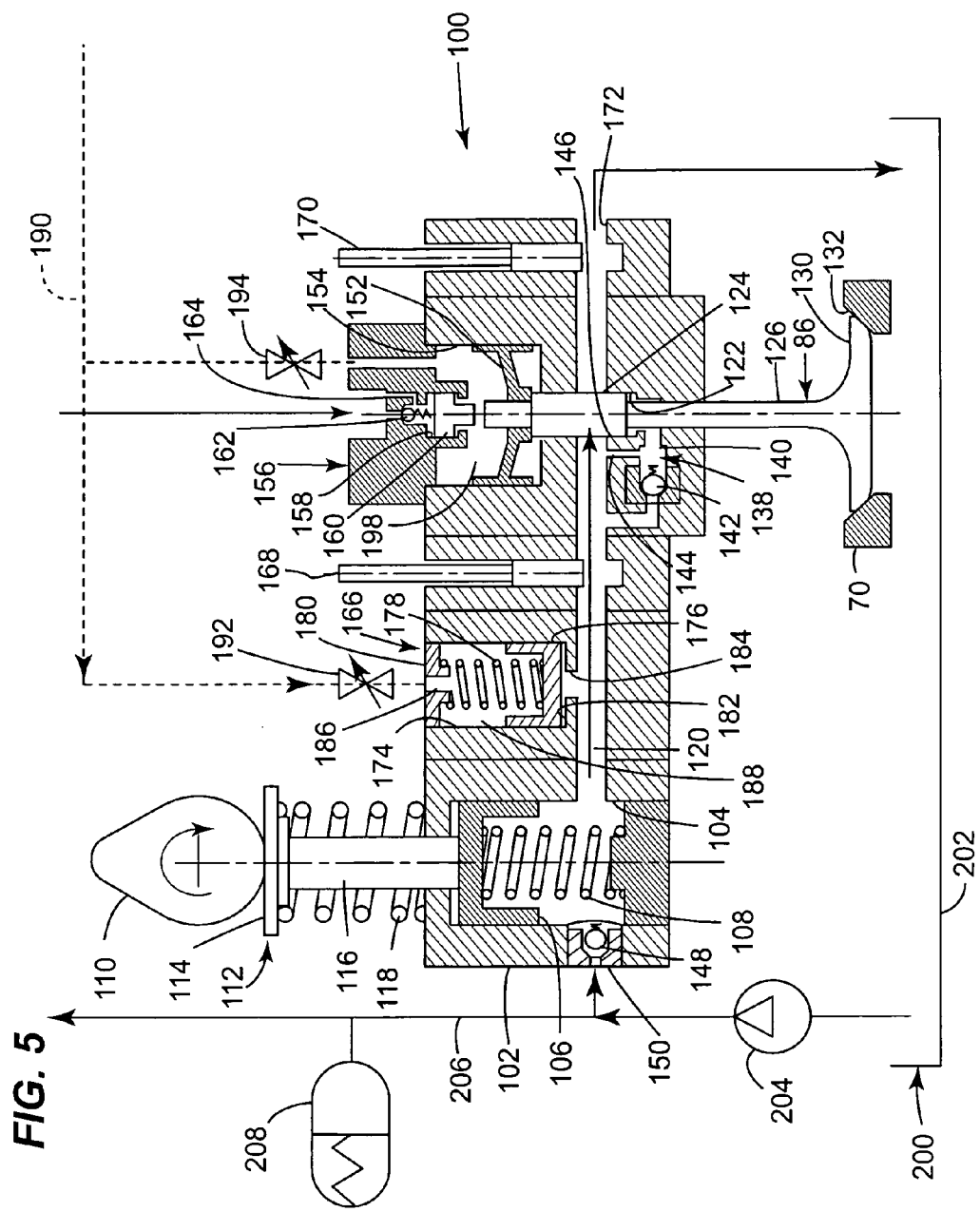
FIG. 5 is a view similar to FIG. 4 but showing air springs and additional features of a developed embodiment of a hydro-mechanical valve actuating system according to the invention for use with a split-cycle engine.

Referring now to FIGS. 4 and 5, numerals 99 and 100 indicate differing embodiments of a hydro-mechanical system for actuating outwardly opening engine valves, such as crossover passage valves 84 and 86 of the split-cycle engine 50. FIG. 4 illustrates a basic embodiment 99 of the hydro-mechanical system according to the invention. FIG. 5 illustrates a developed embodiment 100 including additional features and improvements not found in the basic embodiment 99. Both embodiments 99, 100 are here described together, wherein like numerals indicate like features of the two embodiments.

Each embodiment 100, 99 includes a mechanism contained within or supported by a body 102 (FIG. 5), 103 (FIG. 4). The body 102, 103 could be made as a single piece, such as an engine cylinder head or a separate block, or it could be made as two or more separate assemblies secured together to form a unitary body 102, 103.

Each body 102, 103 includes a plunger cylinder 104 carrying a plunger 106. A plunger return spring 108 may be used in the plunger cylinder 104 and biases the plunger 106 upwardly in a plunger returning direction. An engine drive actuator, such as an engine driven cam 110 engages a cam follower 112. The cam follower 112 includes a tappet 114 engaging the cam 110 and a plunger shaft 116 engaging the plunger 106 for actuating the plunger 106 downward. A follower return spring 118 maintains the follower 112 against the cam 110 at all times.

Plunger cylinder 104 is in fluid communication with a main chamber 120, which extends through the body 102, but only partially through body 103. The main chamber 120 communicates with a valve cylinder 122 that receives a valve piston 124 for reciprocation therein. The valve piston 124 is fixed on the stem 126 of outwardly opening XovrE valve 86 (and optionally on outwardly opening XovrC valve 84). XovrE valve 86 has a valve head 130 that closes against an outwardly facing valve seat 132 within crossover passage 78 (not shown) in cylinder head 70 of the split-cycle engine 50.

A seating control device or brake 138 is formed in the body 102, 103 in an oil passage 140 to the lower end of the valve piston 124. A check valve 142 in the passage 140 closes during valve closing and directs flow through a restricted return passage such as seating control bleed orifice 144 that, together with valve piston clearance 146 in the valve cylinder 122, controls the valve seating rate.

In the basic embodiment 99 (FIG. 4), the main chamber 120 is supplied with hydraulic oil at controlled pressure through a pressure control valve 149 to an inlet 150 from an external source, not shown, or the oil supply of an associated engine, not shown. In the currently developed embodiment 100 (FIG. 5), a check valve 148 is provided in an inlet 150 to receive makeup oil into the main chamber 120 and prevent reverse flow out the inlet.

In both embodiments 100, 99, the engine valve 86 is opened by hydraulic oil in a manner to be subsequently described. In the basic embodiment 99 (FIG. 4), a mechanical spring 151 in a spring chamber 153 engages the valve piston 124 or stem 126 with a mechanical closing force. In the developed embodiment 100 (FIG. 5), an air piston 152 carried on the valve stem 126 reciprocates in an air cylinder 154 to close the valve 86 in response to air spring pressure to be subsequently more fully described.

An additional feature found in the body 102 of embodiment 100 (FIG. 5), but not in embodiment 99, includes a full lift hydraulic lift brake 156 positioned at the top of the valve air cylinder 154. The brake 156 includes a hydraulic cylinder 158 carrying a reciprocable brake piston 160 engagable by the engine valve stem 126 near the full lift position of the valve 86. A full lift check valve 162 allowing make-up oil inlet flow, and a restricted return passage, such as bleed orifice 164 restricting oil outflow, combine to slow the valve motion before full lift.

The body 102 (FIG. 5) also includes a hydraulic overtravel accumulator 166 positioned between the plunger 106 and the XovrE valve 86 to store and recover hydraulic energy. Additionally, a locking solenoid valve 168, shown in a closed position in FIG. 5, is located between the accumulator 166 and the XovrE valve 86 to lock the valve piston 124 and allow energy recovery, therefore reducing parasitic hydraulic losses.

A timing solenoid valve 170 is positioned beyond the XovrE valve 86 at an outlet end 172 of the main chamber 120.

The timing solenoid valve 170 controls the period of hydraulic actuation pressure generated by the displacement of the plunger 106 which acts against the valve piston 124. That is, although the cam 110 can offer a long period of high pressure and therefore of valve 86 lift, opening of the timing solenoid valve 168 can truncate the XovrE valve 86 lift period to a fraction of the period of the nominal cam 110. In this way, the hydro-mechanical system is "lost motion" in that the continued lift of the cam 110 ceases to produce any hydraulic pressure on the valve piston when the timing solenoid valve 168 is open, and therefore the XovrE valve 86 ceases to move further, excepting for inertia motion.

The accumulator 166 includes an accumulator cylinder 174 in which an accumulator piston 176 reciprocates. A mechanical accumulator return spring 178 fixed on a spring seat 180 may urge the piston 176 downward toward the cylinder end 182, which communicates with oil in the main chamber 120 through an opening 184. Optionally, the accumulator cylinder 174 may communicate with an air pressure source through an opening 186 to form an air spring 188 urging the accumulator piston toward the cylinder end 182.

Referring further to FIG. 5, air pressure from an external source is fed through an air line 190 and pressure control valves 192, 194 into the accumulator cylinder 174 to form the air spring 188 therein and into the valve air cylinder 154 to form an air spring 198 therein.

FIG. 5 also discloses an exemplary oil supply source 200 from an oil container 202, such as an engine oil pan or from a separate system making use of a different fluid, such as hydraulic fluid or similar. A hydraulic pump 204 draws oil from the container 202 and pumps it through an oil line 206 to the check valve 148 in the inlet 150 of the main chamber 120 to maintain a full oil charge therein. An oil pressure accumulator 208 connected to line 206 reduces pressure variations in the line. Line 206 then extends to the full lift check valve 162 to supply makeup oil to the hydraulic brake cylinder 158 of the full lift brake 156.

Sequence of Operation of Hydro-mechanical System 100

The Xovr valves 84, 86 open against high air pressures retained in the Xovr passage(s) 78 and the XovrE valve 86 opens quickly for only about 30 crank angle degrees. To actuate these valves successfully within the pressures and time intervals allowed, particularly for the XovrE valve, the above-described hydro-mechanical valve actuation system embodiment 100 has been developed. The embodiment 100 also allows variations in the lift and timing of the crossover valves.

With reference to FIGS. 6 through 21, the following is a description of the operation of the embodiment 100 XovrE valve actuation system. In order to provide for adjustments in valve timing and valve lift, the cam 110 is designed to actuate the plunger 106 over a stroke greater than that needed to open the engine valve; thus a lost motion system is provided.

Figure 6:
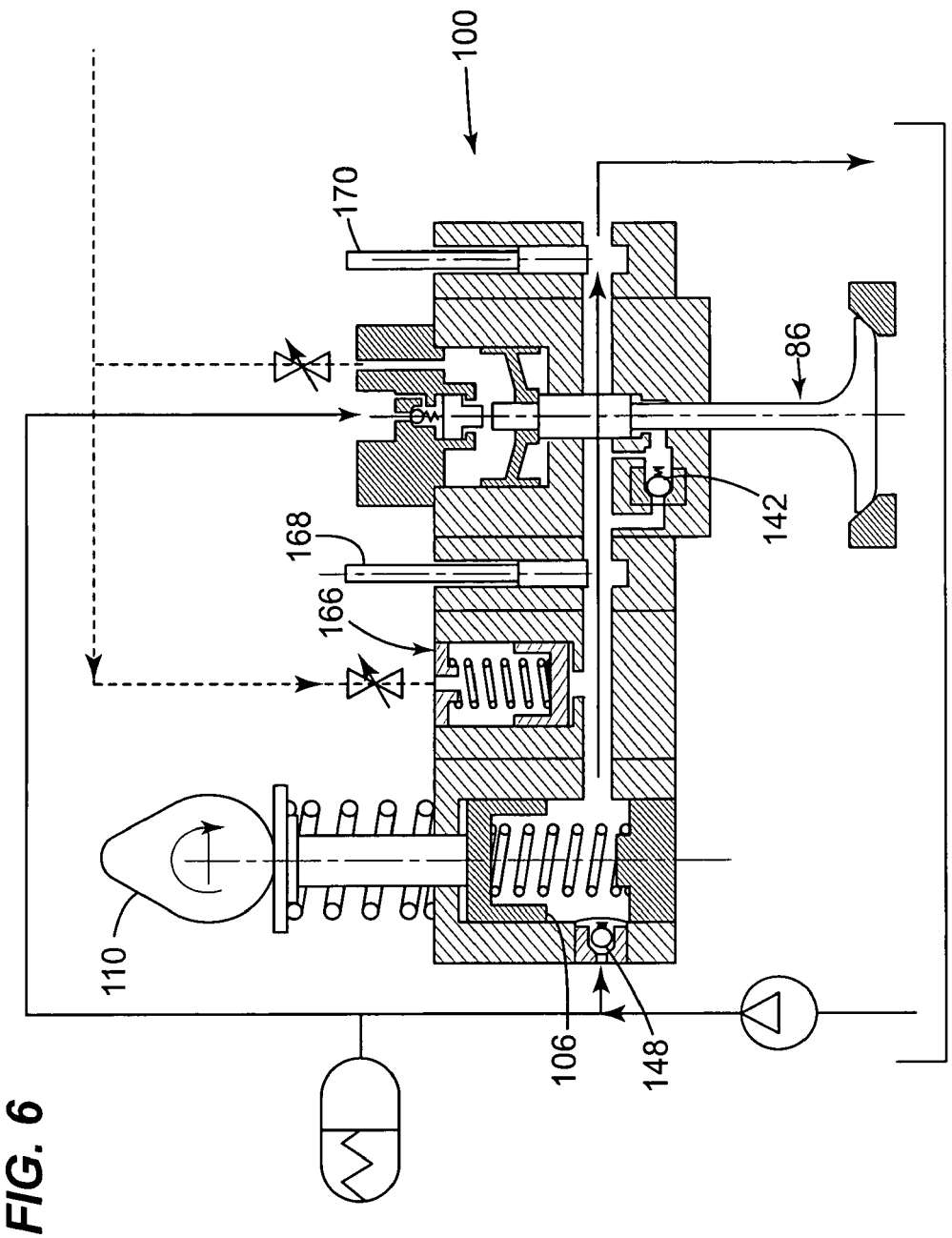
FIGS. 6-21 schematically illustrate the sequential operation of the hydro-mechanical valve actuating system of FIG. 5.

In an initial position shown in FIG. 6, the plunger 106 is at its top dead center position and the inlet check valve 148 is open. The accumulator 166 is empty, and the locking solenoid 168 and timing solenoid 170 are open. The XovrE valve 86 is closed and the seating control check valve 142 is closed.

Figure 7:
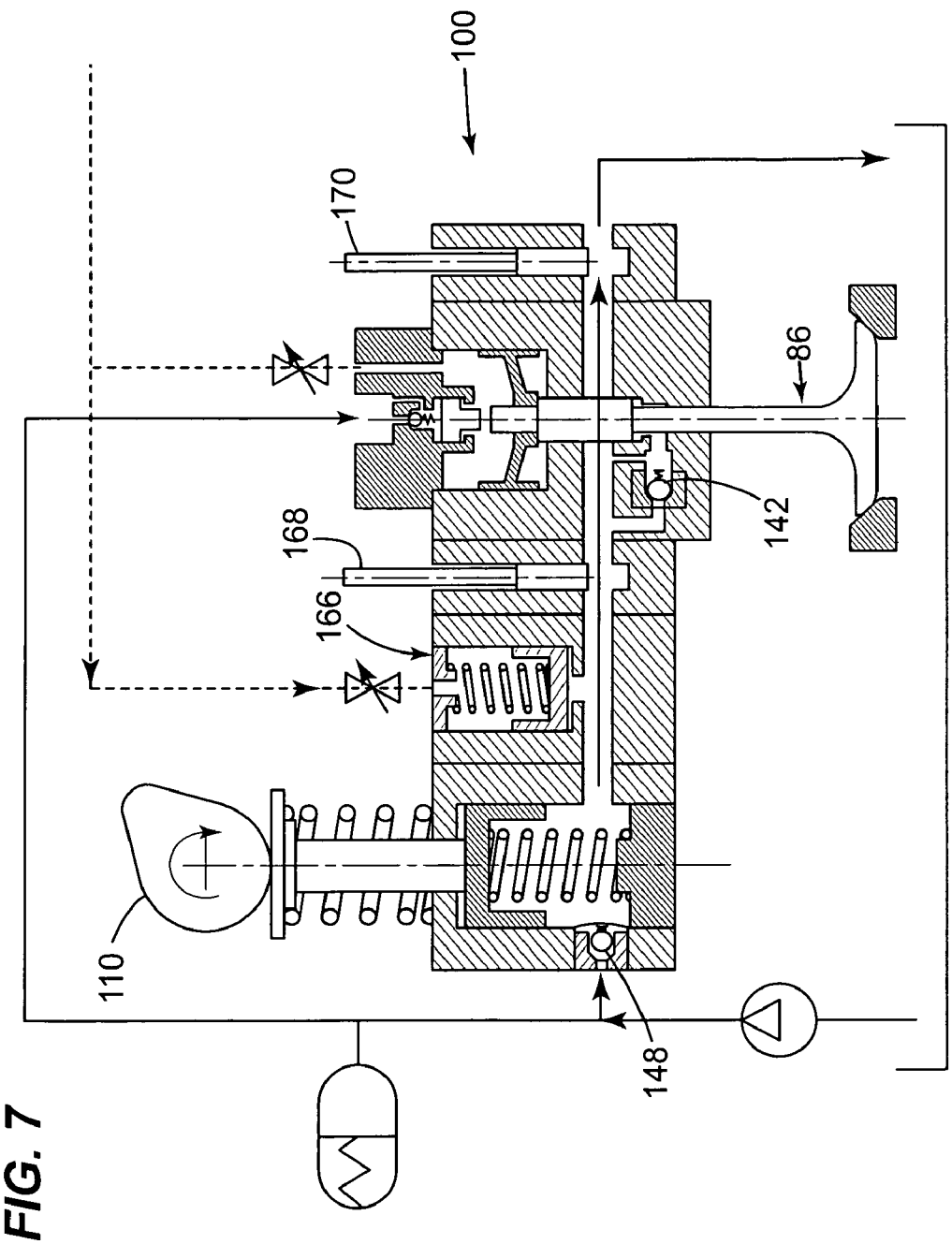
Figure 8:
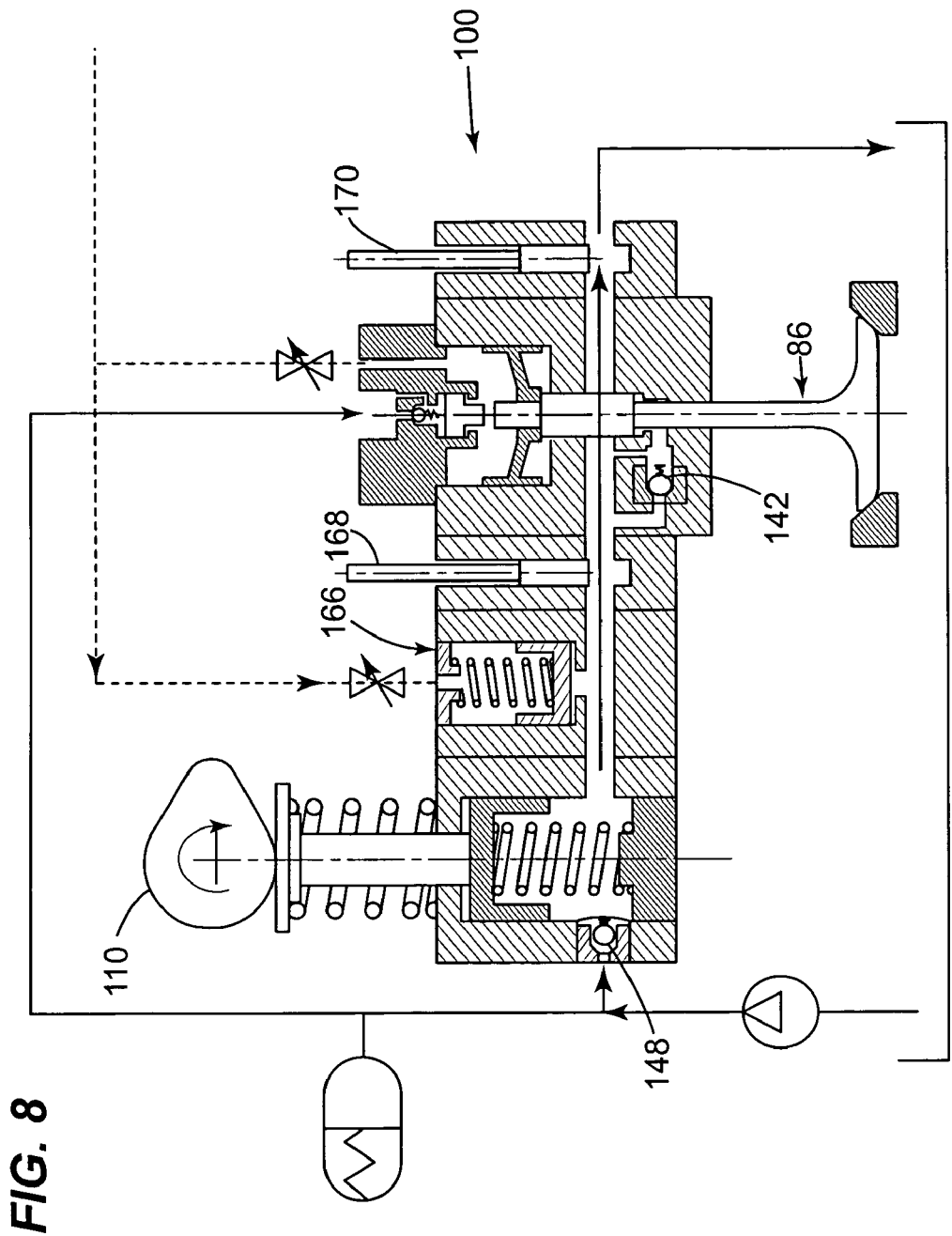
Figure 9:
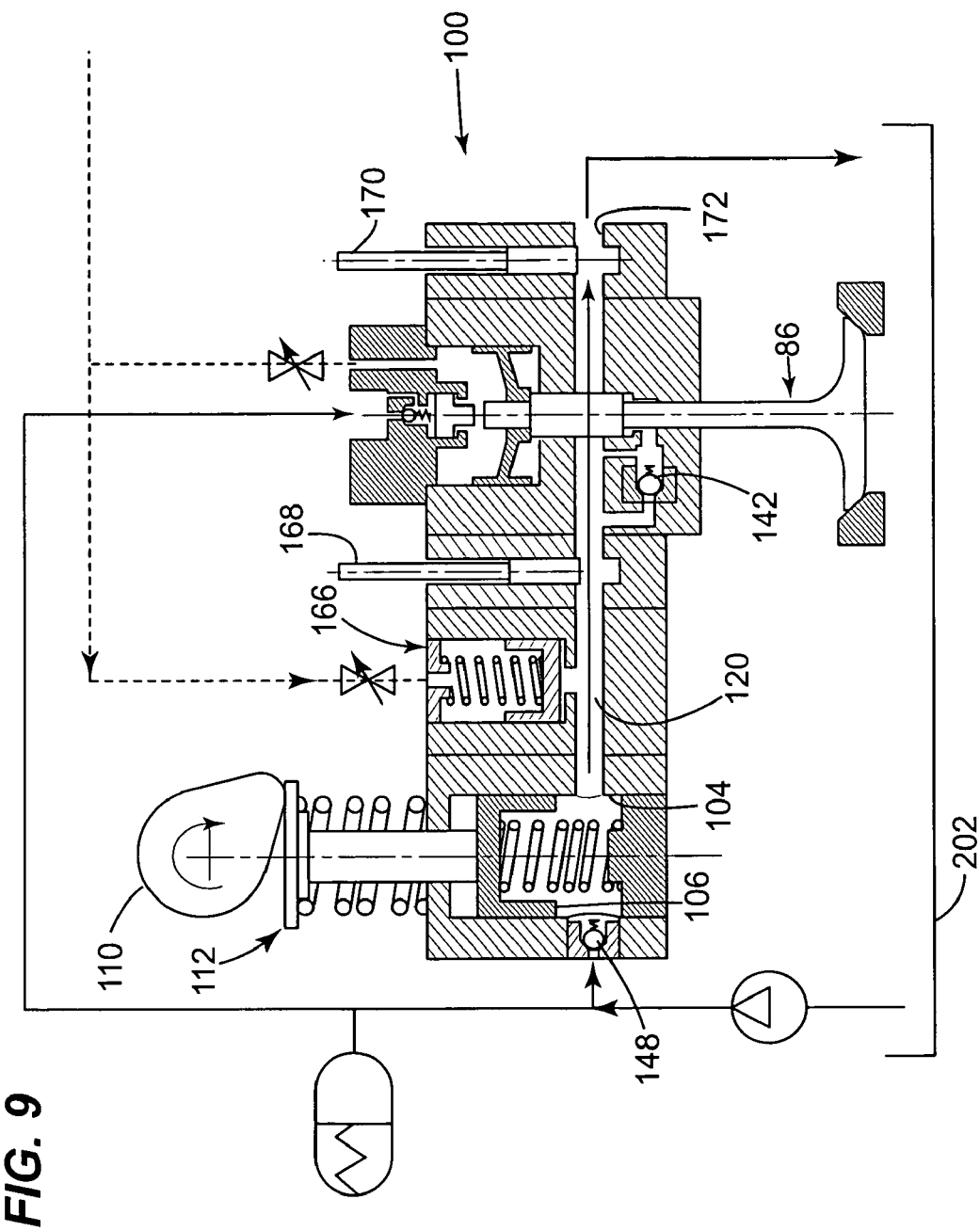

Turning to FIGS. 7-9, the cam rotates in a clockwise direction. As the lobe of the rotating cam 110 engages the cam follower 112 (FIG. 9), the plunger 106 begins to descend from its top dead center position, forcing oil out of the plunger cylinder 104, into the main chamber 120, and out of the main chamber 120 through chamber outlet end 172, where the oil is drained into the oil container pan 202 (shown by arrows). The inlet check valve 148 moves from an open position to a closed position. The seating control check valve 142 remains closed, the locking solenoid 168 and timing solenoid 170 remain open, and the accumulator 166 remains empty. The XovrE valve 86 also remains closed.

Figure 10:
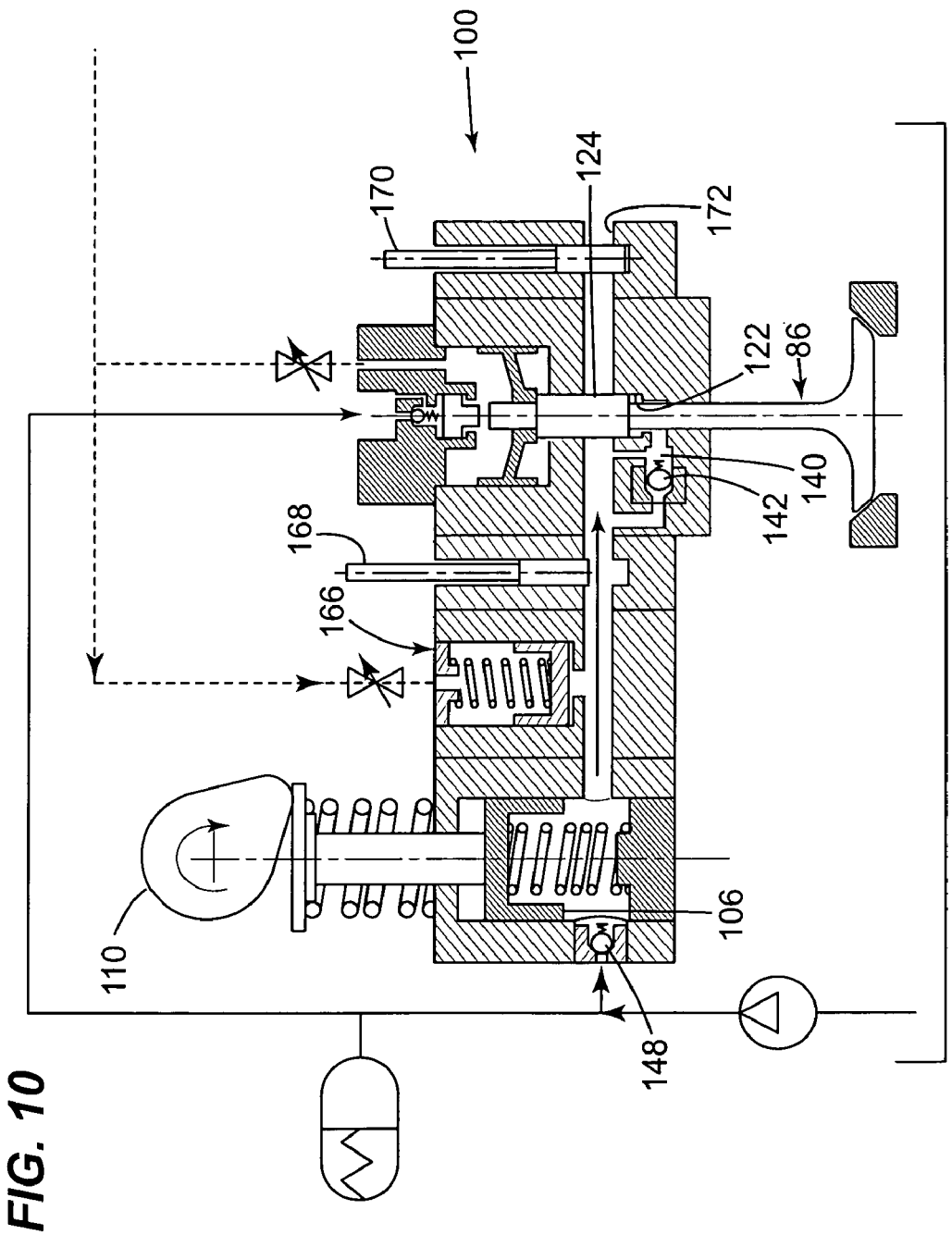

Turning to FIG. 10, as the cam 110 continues its clockwise rotation, the plunger 106 descends further and the timing solenoid valve 170 closes. Closing of the timing solenoid valve 170 blocks the main chamber outlet 172 and forces oil through the valve piston oil passage 140 by opening seat control check valve 142. The oil passes from the valve piston oil passage 140 to the valve cylinder 122 at the bottom of the valve piston 124, cracking opening the XovrE valve 86. The locking solenoid valve 168 remains open, the inlet check valve 148 remains closed, and the accumulator 166 remains empty.

Figure 11:
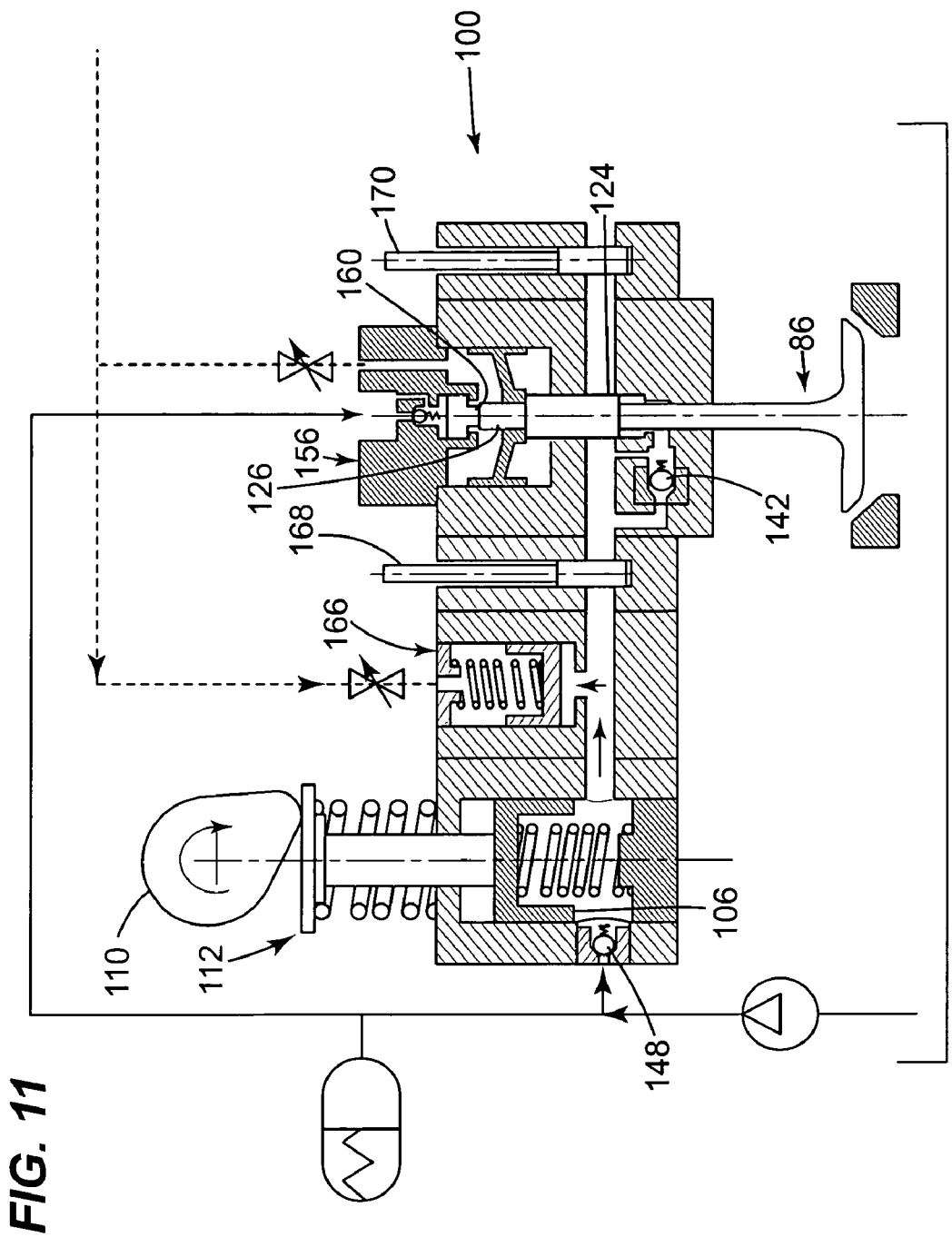

In FIG. 11, the cam 110 has rotated further in the clockwise direction, and the force of the cam lobe against the cam follower 112 continues the descent of the plunger 106. The locking solenoid valve 168 is now closed, and closing of the locking solenoid valve blocks oil flow to the piston 124 of the XovrE valve 86, ending the forced lift. However, inertia of the XovrE valve 86 continues its upward motion, and the valve stem 126 engages the lift brake piston 160 of the full lift brake 156. Excess oil from the continued travel of the plunger 106 that is blocked by the locking solenoid valve 168 enters accumulator 166 to store energy (as shown by arrows). The inlet check valve 148 and timing solenoid valve 170 remain closed, while the seating control check valve 142 remains open.

Figure 12:
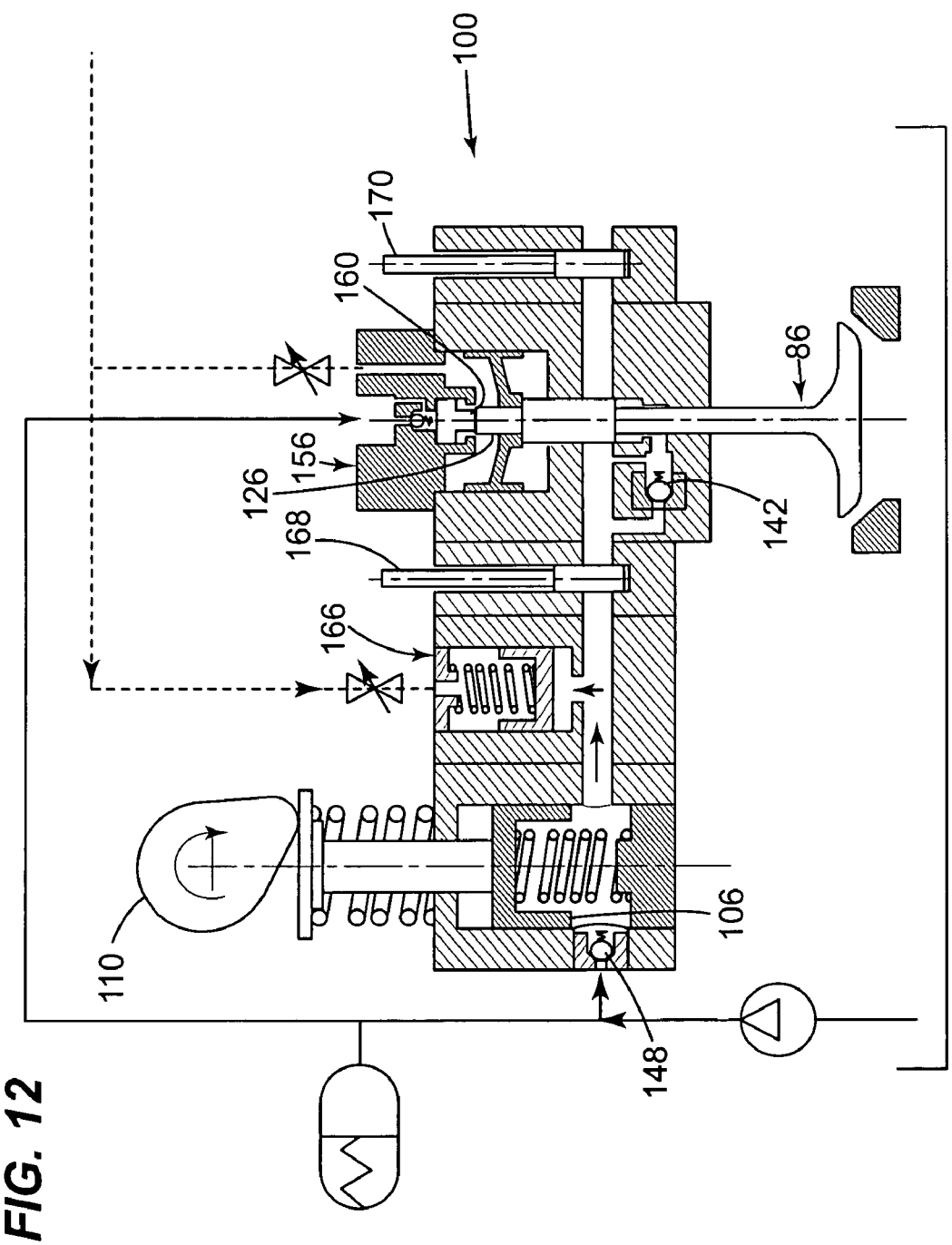
Figure 13:
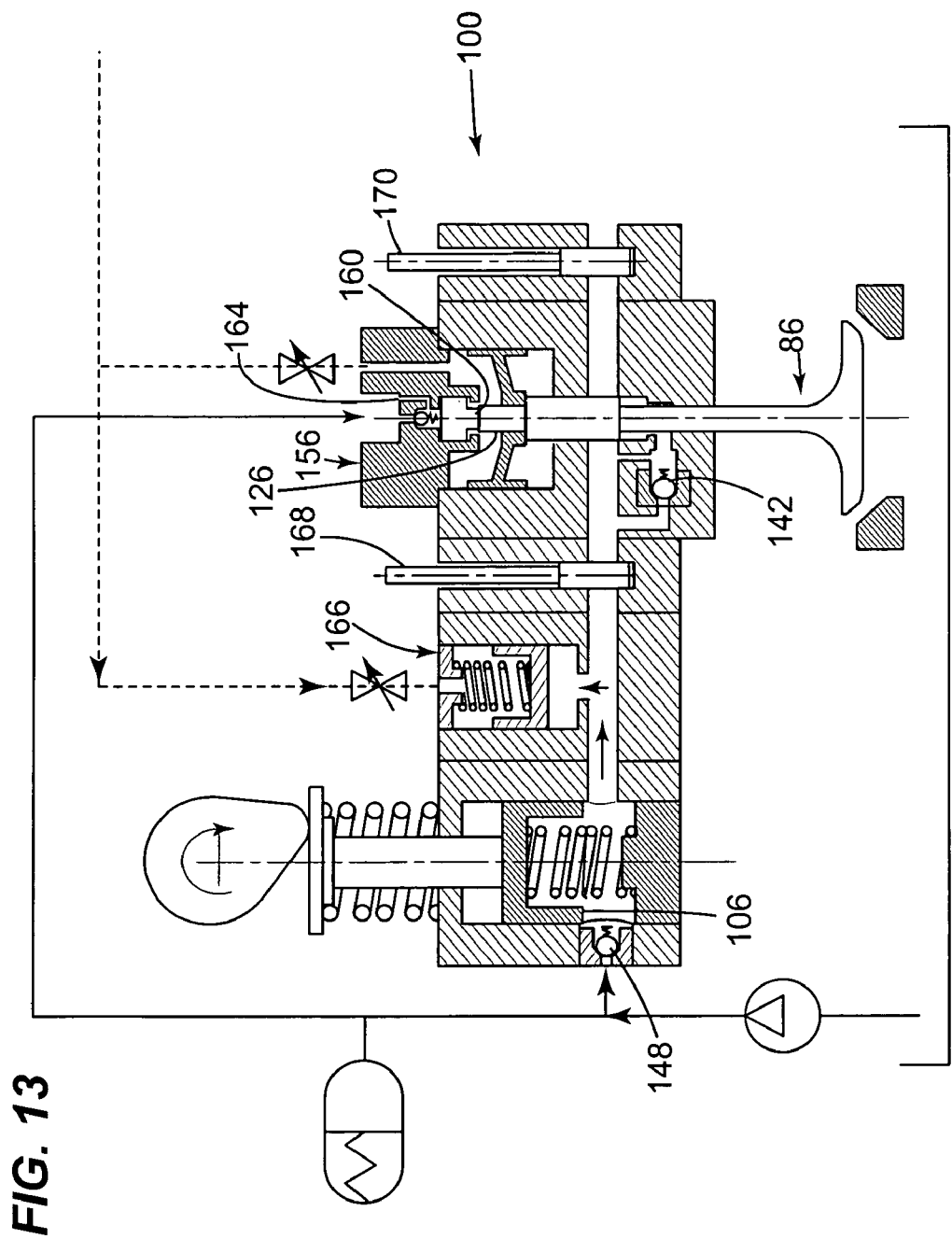

Turning to FIGS. 12 and 13, as the valve stem 126 moves the piston 160 of the full lift brake 156, oil is forced through the bleed orifice 164, thus slowing upward motion of the XovrE valve 86. The XovrE valve 86 comes to rest at full lift with the full lift brake 156 engaged, and the seating control check valve 142 closes. The plunger 106 descends even further, continuing the flow of oil into the accumulator 166 (as shown by arrows) to store energy. The timing solenoid valve 170, locking solenoid valve 168, and inlet check valve 148 remain closed.

Figure 14:
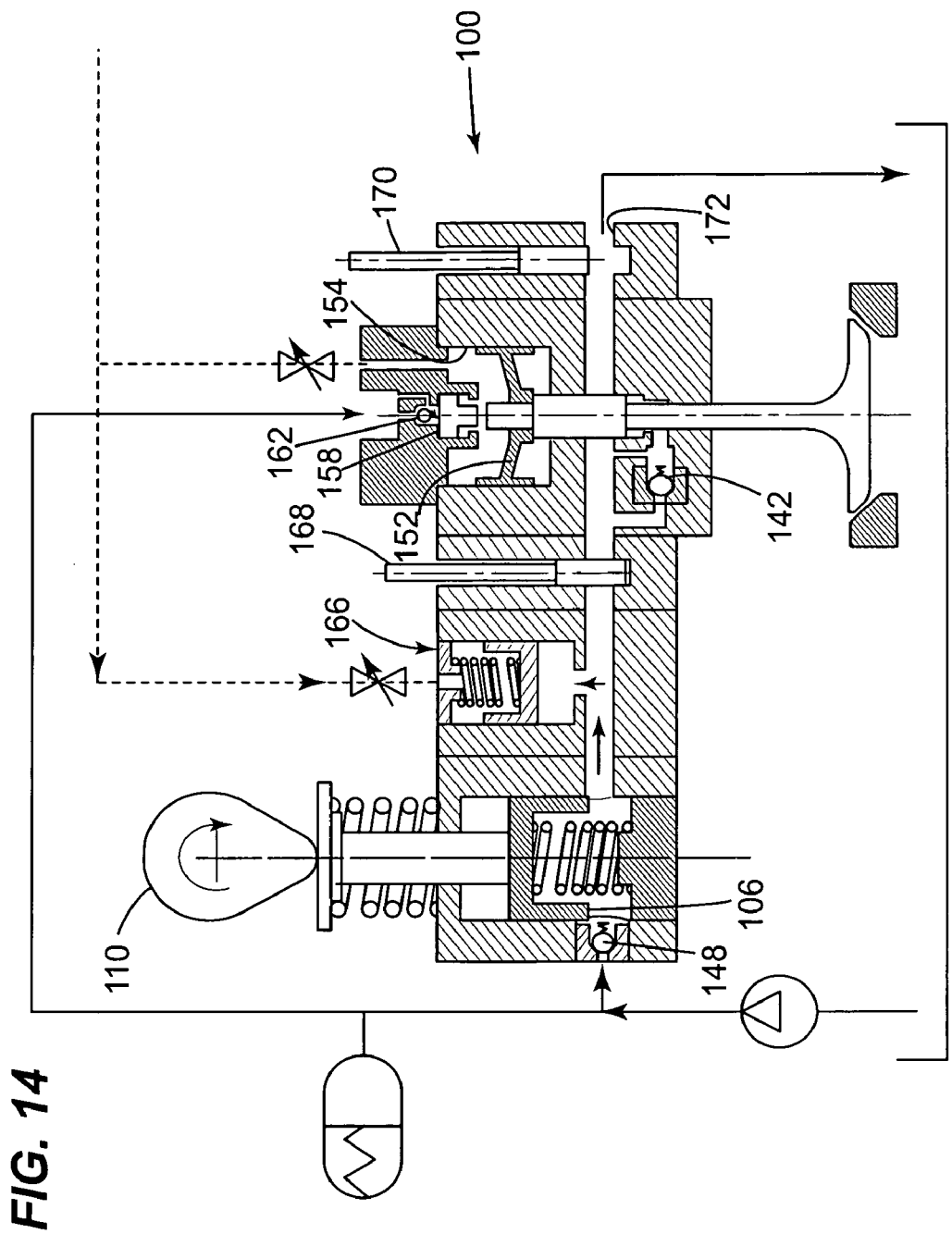

When the cam 110 has rotated to its highest point (at the peak of the lobe) from its initial position, the plunger 106 reaches its bottom dead center position as shown in FIG. 14. The maximum amount of energy has now been stored in the accumulator 166. Timing solenoid valve 170 opens, allowing draining of oil from the valve cylinder 122 (as shown by an arrow) and permitting pressurized air in the valve air cylinder 154 to begin XovrE valve 86 closing by forcing air piston 152 downward. However, the timing solenoid valve 170 may open independently from the rotational position of the cam 110. In other words, the timing solenoid valve 170 does not have to open precisely at the time the cam 110 reaches its highest point. Also shown in FIG. 14, replacement of oil through brake check valve 162 to valve lift brake cylinder 158 begins. Locking solenoid valve 168, inlet check valve 148, and seating control check valve 142 remain closed.

Figure 15:
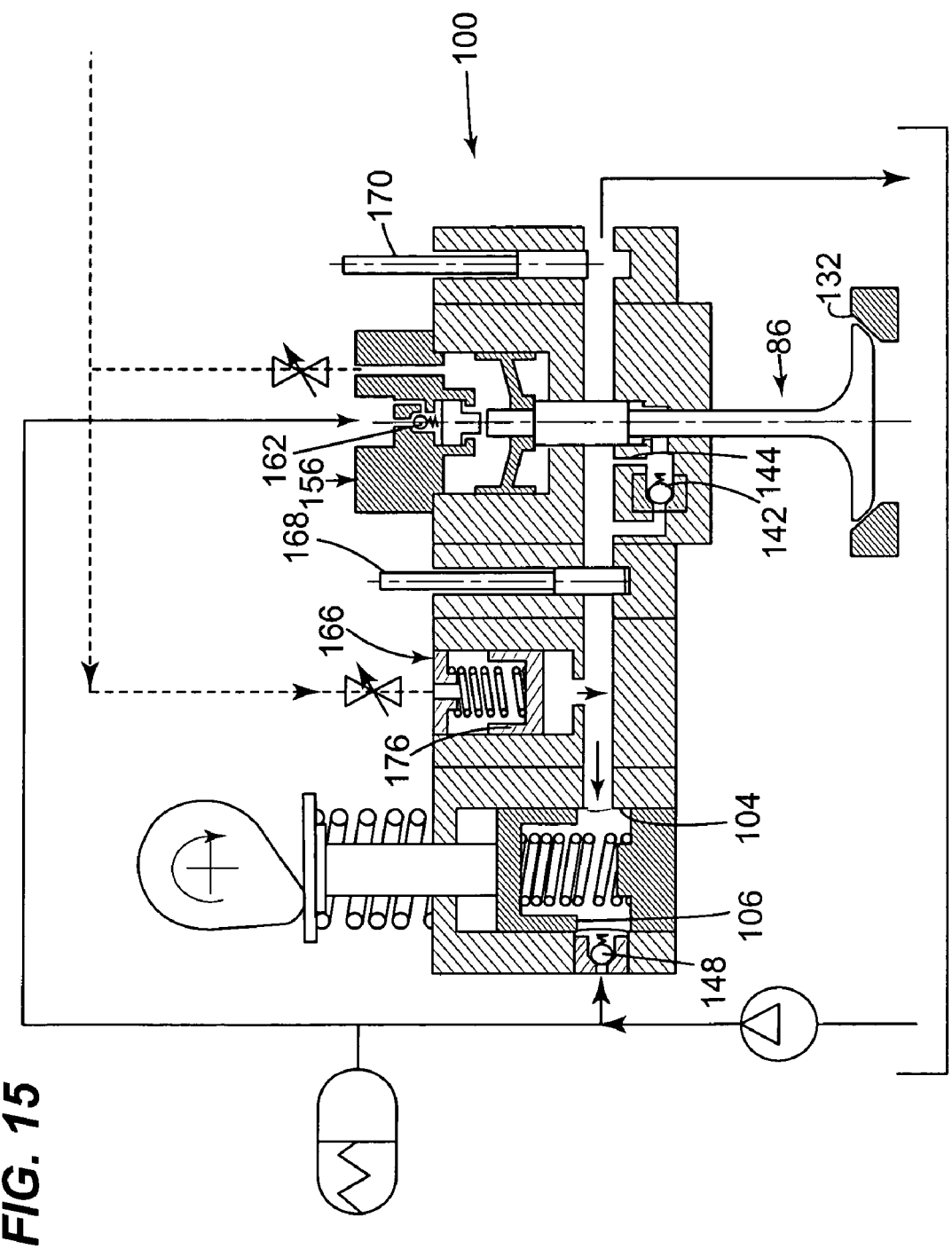
Figure 16:
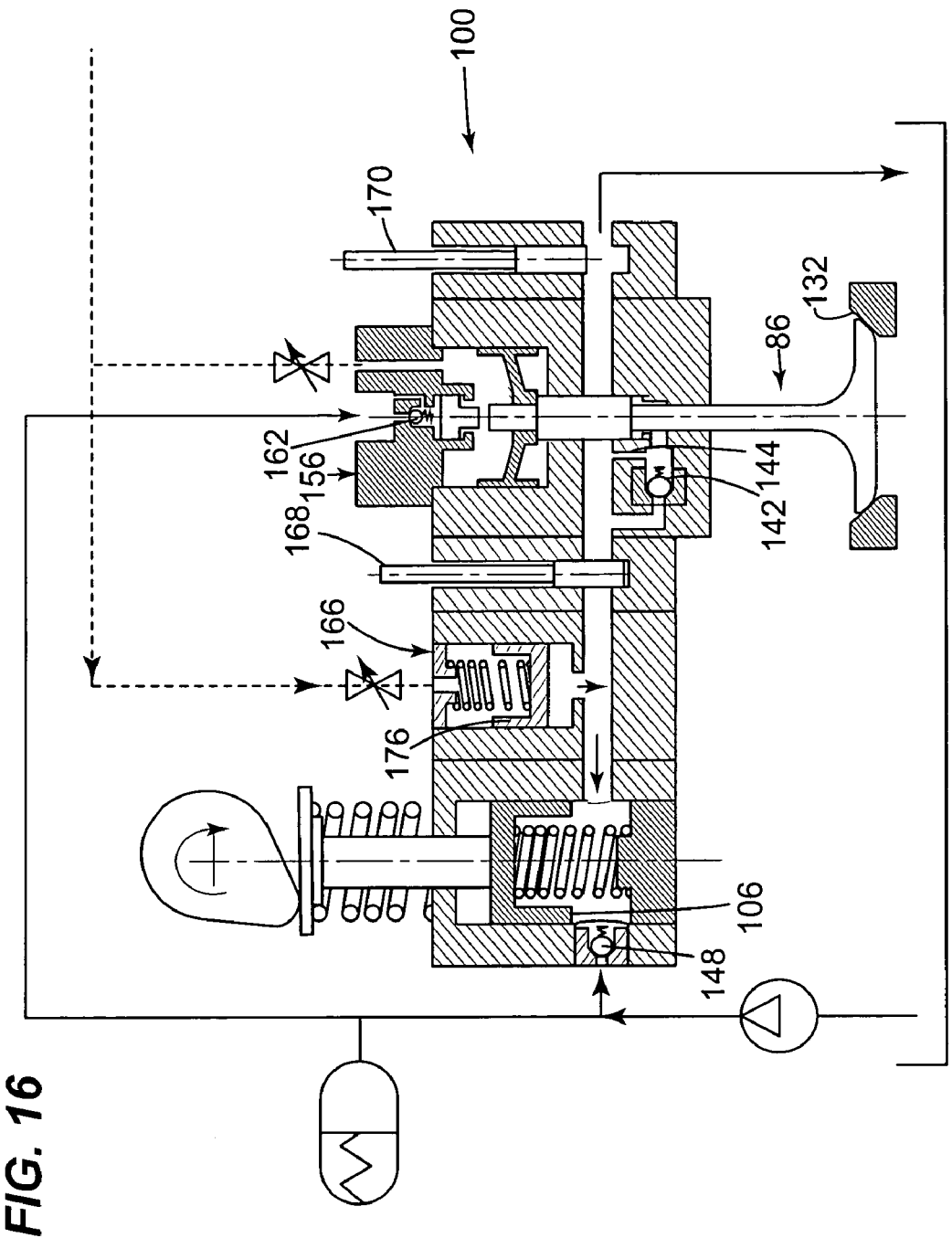

Turning to FIGS. 15 and 16, as the plunger 106 begins returning from its bottom dead center position, the accumulator 166 begins to empty (as shown by arrows). Air pressure urges accumulator piston 176 down, returning oil from the accumulator 166 to plunger cylinder 104 and releasing stored energy to retract plunger 106 and drive cam rotation. The full lift brake 156 finishes replenishing, and the brake check valve 162 closes. The closed seating control check valve 142 causes oil to be diverted to bleed orifice 144, slowing engagement of XovrE valve 86 with valve seat 132. In FIG. 16, the XovrE valve 86 has closed. The timing solenoid valve 170 remains open, and the locking solenoid valve 168 and inlet check valve 148 remain closed.

Figure 17:
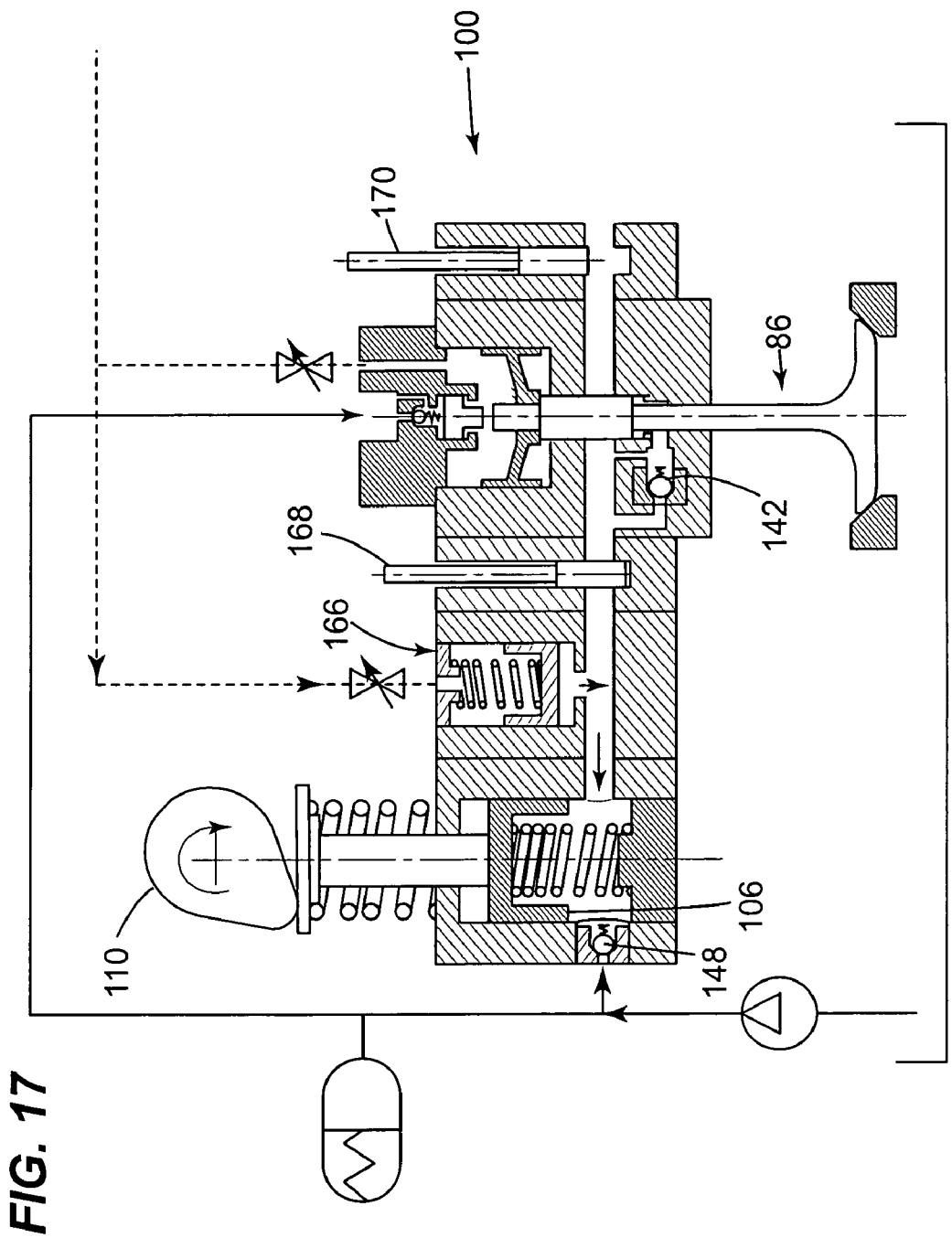
Figure 18:
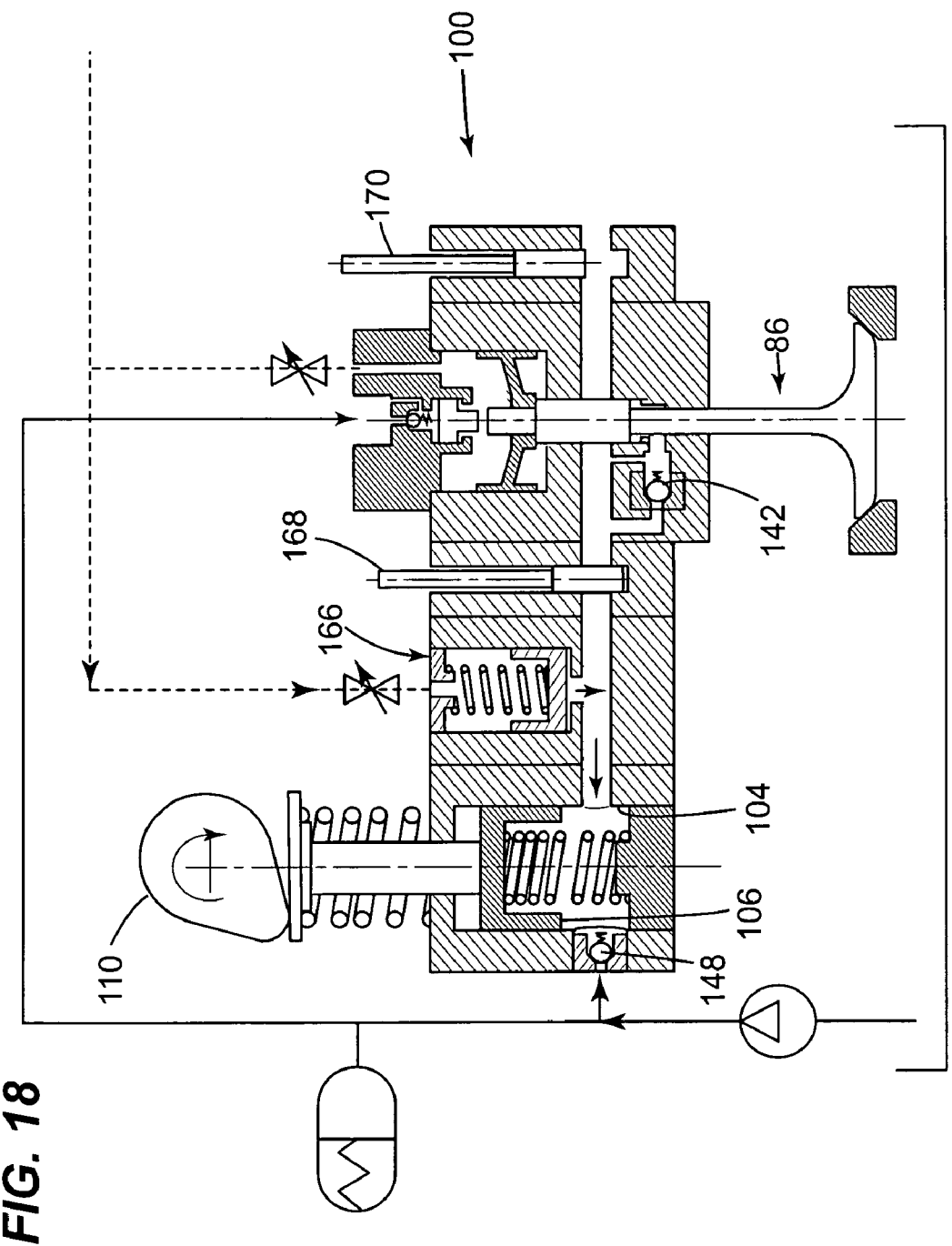
Figure 19:
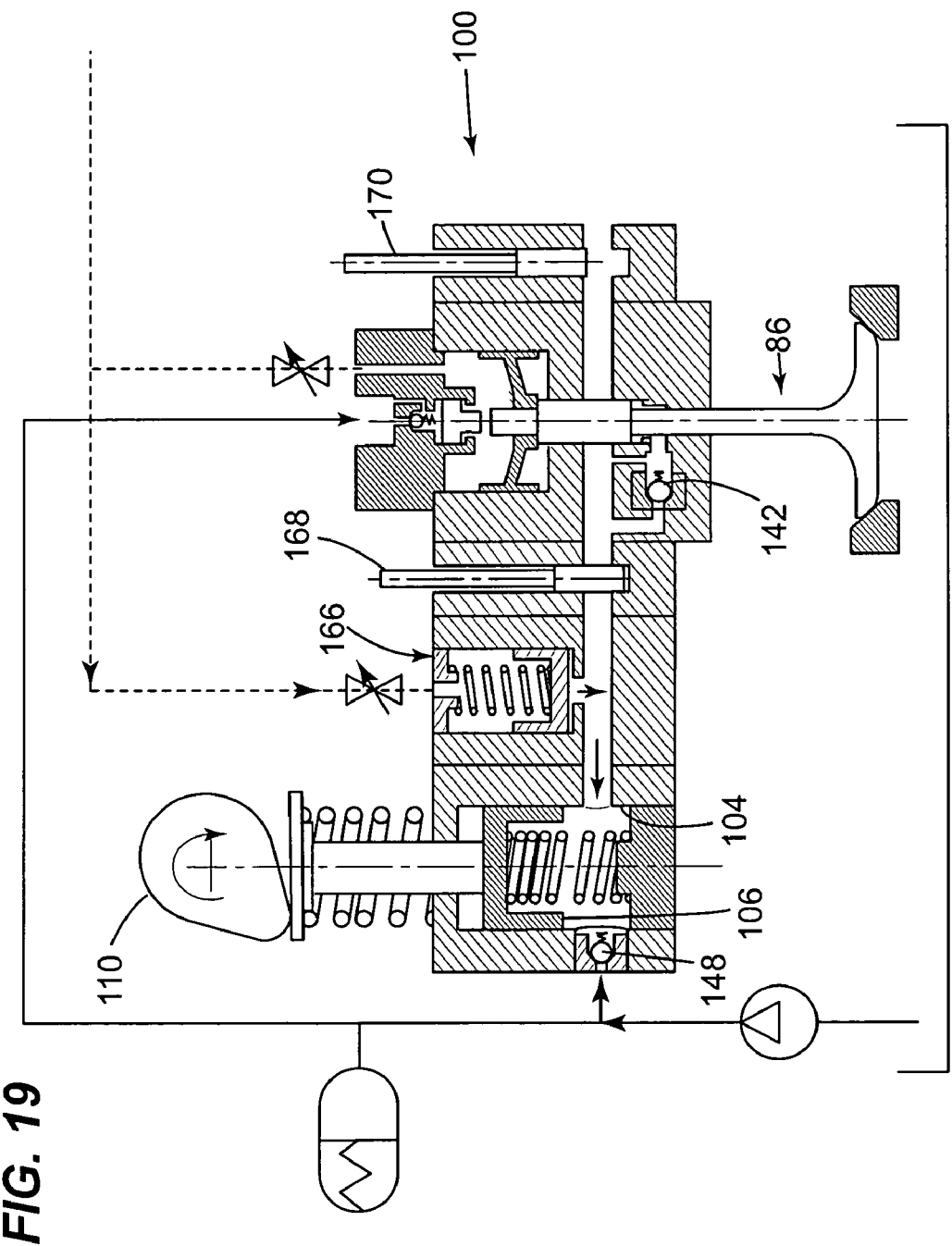

Turning to FIGS. 17-19, as the cam 110 continues its clockwise rotation, the plunger 106 continues returning toward its top dead center position. The accumulator 166 continues to empty, returning oil to the plunger cylinder 104 (as shown by arrows). In FIG. 19, the accumulator 166 has emptied. The locking solenoid valve 168, inlet check valve 148, seating control check valve 142, and XovrE valve 86 remain closed. The timing solenoid valve 170 remains open.

Figure 20:
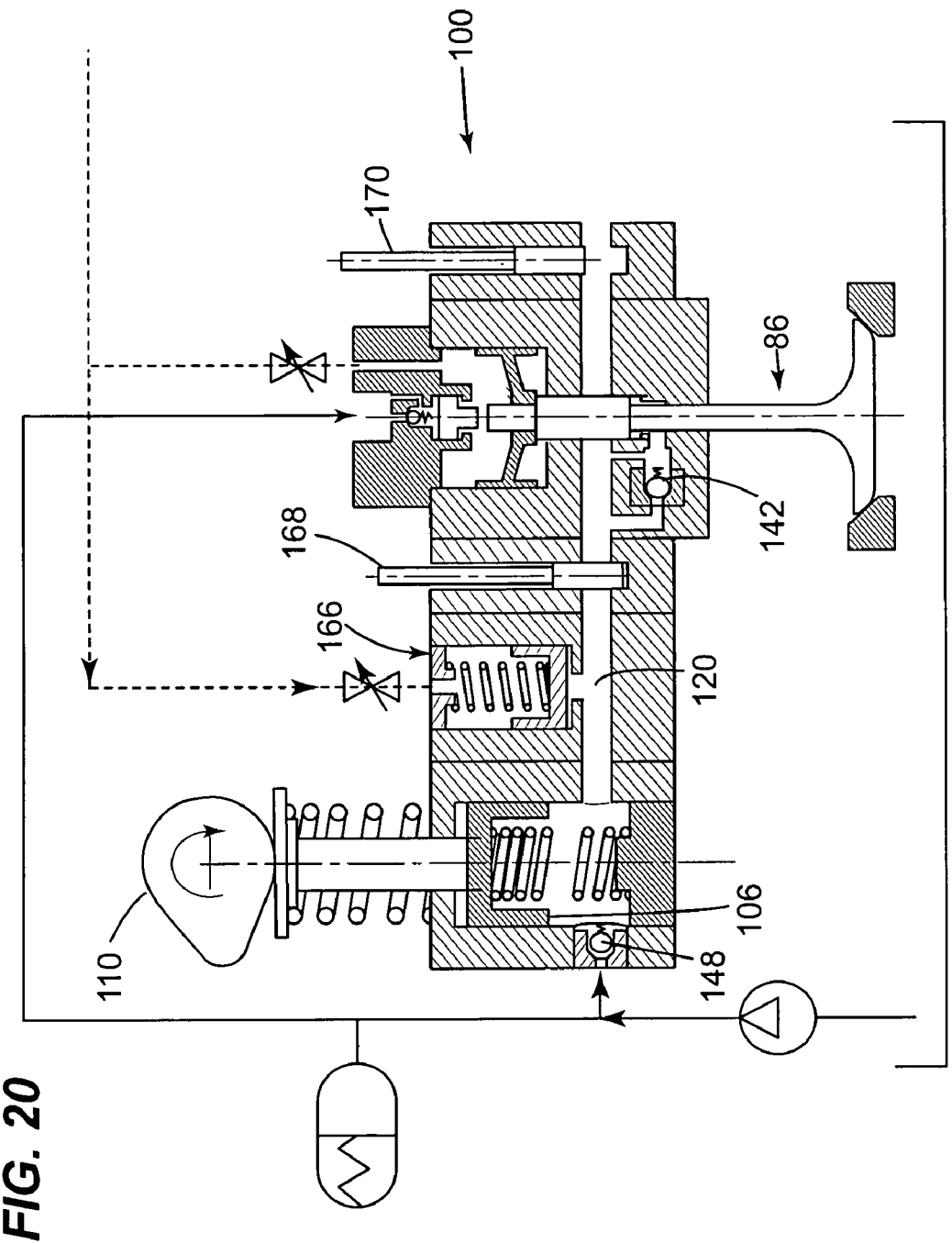

As shown in FIG. 20, while the cam 110 is rotating to bring the plunger 106 back to its TDC position and the accumulator is emptied, the inlet check valve 148 opens, allowing oil replenishment to main chamber 120. The locking solenoid valve 168, seating control check valve 142, and XovrE valve 86 remain closed, while the timing solenoid valve 170 remains open. The accumulator 166 is empty.

Figure 21:
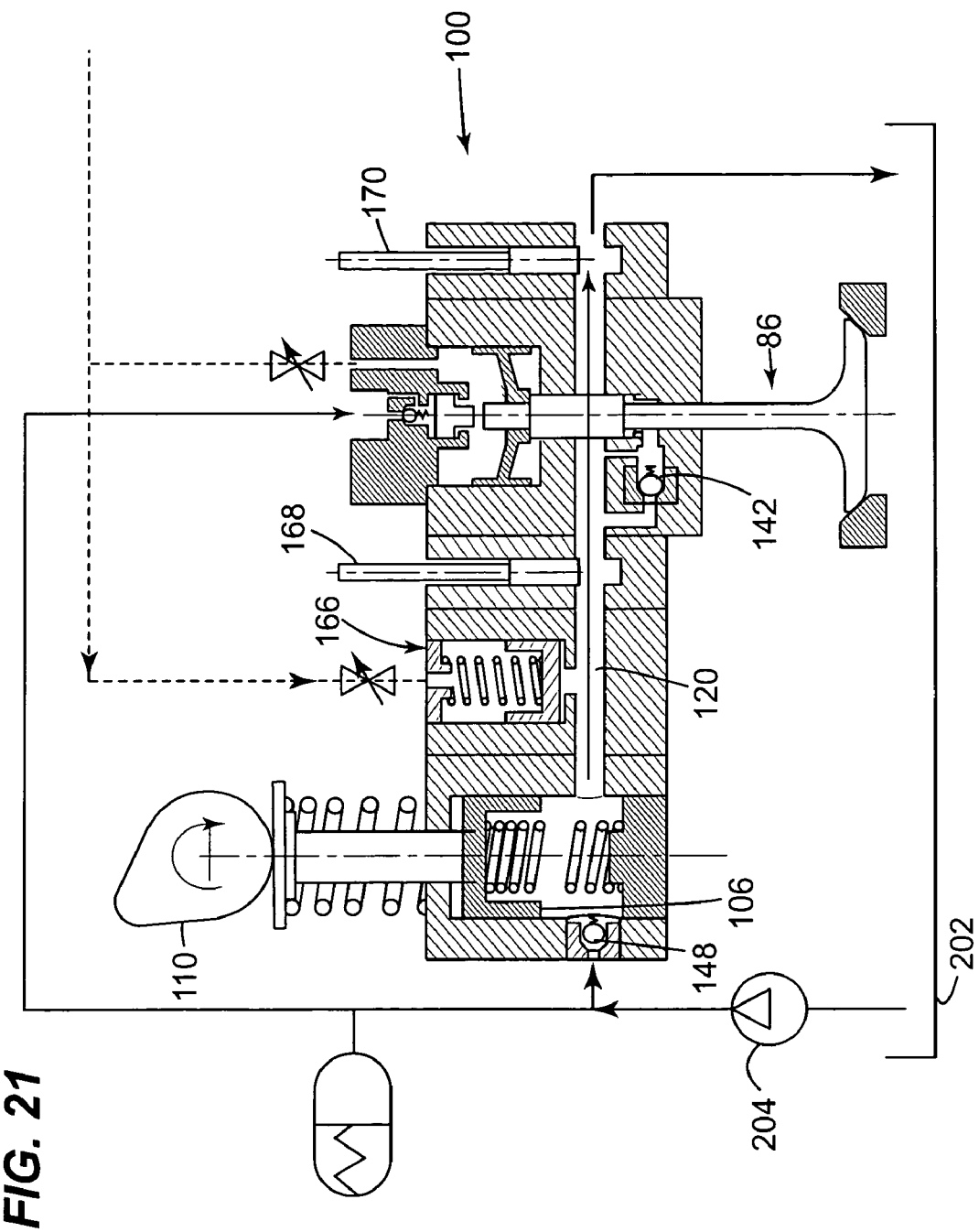

Turning finally to FIG. 21, the cam 110 continues to rotate in a clockwise direction back toward its initial starting position to complete a 360 degree rotation. The locking solenoid valve 168 opens, and the main chamber 120 is filled with oil (as shown by arrows) continuously provided as needed by operation of the hydraulic pump 204 delivering oil from the oil container 202 through the open inlet check valve 148. The timing solenoid 170 remains open, while the seating control check valve 142 and XovrE valve 86 remain closed. The plunger 106 remains at its top dead center position, and the accumulator 166 remains empty. The cycle may then repeat itself, returning first to the step shown in FIG. 6.

In the alternative embodiment 99, operation of the plunger 106 and the valve piston 124 with the seating control 138 with check valve 142 could be essentially as described above. However, the accumulator 166, locking solenoid 168 and timing solenoid 170 are omitted and the valve piston air spring 198 is replaced by the mechanical spring 151. Thus, XovrE valve timing and lift would be fixed and the mechanical spring 151 would absorb valve lift control forces. However, the missing timing devices and accumulator could be added if desired and the mechanical spring could replace the air spring as a XovrE valve closer and lift control. The accumulator could also be added and use a mechanical return spring if desired.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A hydro-mechanical system for actuating an outwardly opening valve of an engine, the system comprising:

a body having a plunger cylinder in hydraulic fluid communication with a valve cylinder;

a plunger in the plunger cylinder and reciprocable to displace hydraulic fluid into the valve cylinder;

an outwardly opening engine valve reciprocable in the body and connected with a valve piston in the valve cylinder, the engine valve being opened by the hydraulic fluid displaced by the plunger into the valve cylinder and acting against the valve piston;

an actuator for reciprocating the plunger, the actuator including an engine drive mechanism engaging the plunger for moving the plunger through pumping and return strokes;

the engine drive mechanism including a cam engaging a follower operative to reciprocate the plunger on the pumping stroke and at least one return spring effective to move the plunger and the follower on the return stroke;

the return spring including a follower spring and a plunger spring operative to maintain the plunger in effective engagement with the follower and the cam; and a valve spring for returning the engine valve to engage an outwardly facing valve seat, thereby closing a gas passage of the engine controlled by the engine valve.

2. The hydro-mechanical system of claim 1 wherein the body includes a hydraulic main chamber communicating the plunger cylinder with the valve cylinder.

3. The hydro-mechanical system of claim 2 wherein the valve piston is carried on a stem of the engine valve and is received in the valve cylinder, which communicates with the body main chamber to receive pressure oil from the plunger cylinder into the valve cylinder for opening the valve.

4. The hydro-mechanical system of claim 3 wherein communication of the valve cylinder with the body main chamber is primarily through a seating control that includes a check valve and a restricted return passage which limit valve seating impact.

5. The hydro-mechanical system of claim 1 wherein the valve spring is a mechanical spring biasing the engine valve inward toward the valve seat.

6. The hydro-mechanical system of claim 1 wherein the valve spring is an air spring biasing the engine valve inward toward the valve seat.

7. The hydro-mechanical system of claim 6 wherein the valve air spring includes an air piston connected with the engine valve and open to controlled air pressure biasing the air piston inward for closing the engine valve when the hydraulic pressure from the plunger is cut off.

8. The hydro-mechanical system of claim 7 wherein the valve air piston is mounted on a stem of the engine valve and is received in an air cylinder in the body.

9. The hydro-mechanical system of claim 8 including a hydraulic lift brake having a brake piston engaged by the valve stem upon engine valve opening and forcing hydraulic fluid against a check valve and through a restricted passage to slow opening impact of the engine valve.

10. The hydro-mechanical system of claim 9 wherein the lift brake is filled from a pressurized hydraulic fluid source.

11. The hydro-mechanical system of claim 2 including a timing valve operable to cut off outflow from the main chamber and initiate valve lift when the plunger is being actuated.

12. The hydro-mechanical system of claim 11 including:
a hydraulic accumulator in the body and including an accumulator piston reciprocable in an accumulator cylinder connected with the main chamber between the plunger cylinder and the valve cylinder; and
a locking valve between the accumulator cylinder and the valve cylinder and operable to cut off hydraulic fluid flow from the plunger cylinder to the valve cylinder to control engine valve closing timing and initiate filling of the hydraulic accumulator during the remaining plunger stroke to store energy for reuse in returning the plunger to its initial position, thereby reducing energy loss.

13. The hydro-mechanical system of claim 12 wherein the timing valve is opened to initiate draining of hydraulic fluid from the valve cylinder and allow closure of the engine valve by the valve spring.

14. The hydro-mechanical system of claim 13 wherein the hydraulic main chamber is supplied with make-up hydraulic fluid from a pressurized source through a check valve to replace hydraulic fluid discharged during valve closing and prevent return flow to the source.

15. The hydro-mechanical system of claim 1 in combination with a split-cycle engine wherein the engine valve is a crossover expansion valve of the split-cycle engine.

16. The hydro-mechanical system of claim 14 in combination with a split-cycle engine including:
a crankshaft rotatable about a crankshaft axis;
a compression piston slidably received within a compression cylinder and operatively connected to the crankshaft such that the compression piston reciprocates through an intake stroke and a compression stroke during a single rotation of the crankshaft;
an expansion (power) piston slidably received within an expansion cylinder and operatively connected to the crankshaft such that the expansion piston reciprocates through an expansion stroke and an exhaust stroke during a single rotation of the crankshaft; and
a crossover passage (port) interconnecting the compression and expansion cylinders, the crossover passage including a crossover compression (XovrC) valve and a crossover expansion (XovrE) valve defining a pressure chamber therebetween;
wherein the engine valve is the crossover expansion valve of the split-cycle engine.

17. The combination of claim 16, wherein the hydraulic accumulator includes an air spring acting against the accumulator piston to return stored energy in accumulated hydraulic fluid to the main chamber for restoring the plunger to an initial position.

18. A method of operating a hydro-mechanical system for actuating an outwardly opening valve of an engine, the method including the steps of:
providing a body having a plunger cylinder in hydraulic fluid communication with a valve cylinder, a hydraulic main chamber communicating the plunger cylinder with the valve cylinder, a plunger in the plunger cylinder and reciprocable to displace hydraulic fluid into the valve cylinder, an outwardly opening engine valve reciprocable in the body and connected with a valve piston in the valve cylinder, an actuator for reciprocating the plunger, a timing valve operable to cut off outflow from the main chamber, a hydraulic accumulator in the body having an accumulator piston reciprocable in an accumulator cylinder connected with the main chamber between the plunger cylinder and the valve cylinder, and a locking valve between the accumulator cylinder and the valve cylinder;
descending the plunger to displace hydraulic fluid;
shutting the timing valve such that the displaced hydraulic fluid enters the valve cylinder and acts against the valve piston to initiate opening of the engine valve;
shutting the locking valve after shutting the timing valve and before the engine valve is fully open to cut off hydraulic fluid flow from the plunger cylinder to the valve cylinder;
filling the accumulator to store energy for reuse in returning the plunger to its initial position;
opening the timing valve to begin closing the engine valve;
ascending the plunger until the plunger is fully retracted;
emptying the accumulator as the plunger is ascending to release stored energy; and
opening the locking valve after the plunger is fully retracted.

19. The method of claim 18, including the steps of:
providing a hydraulic lift brake engaging a valve stem of the engine valve; and
engaging the hydraulic lift brake with the valve stem before the engine valve is fully open to dampen the lift of the engine valve as the engine valve approaches a fully open position.

20. The method of claim 18, including the steps of:

providing a seating control check valve for communication between the valve cylinder and the main chamber;

opening the seating control check valve after the timing valve is shut; and closing the seating control check valve when the engine valve is in a fully open position.

21. The method of claim 18, wherein the engine is a split-cycle engine.

* * * * *